Figure 1:
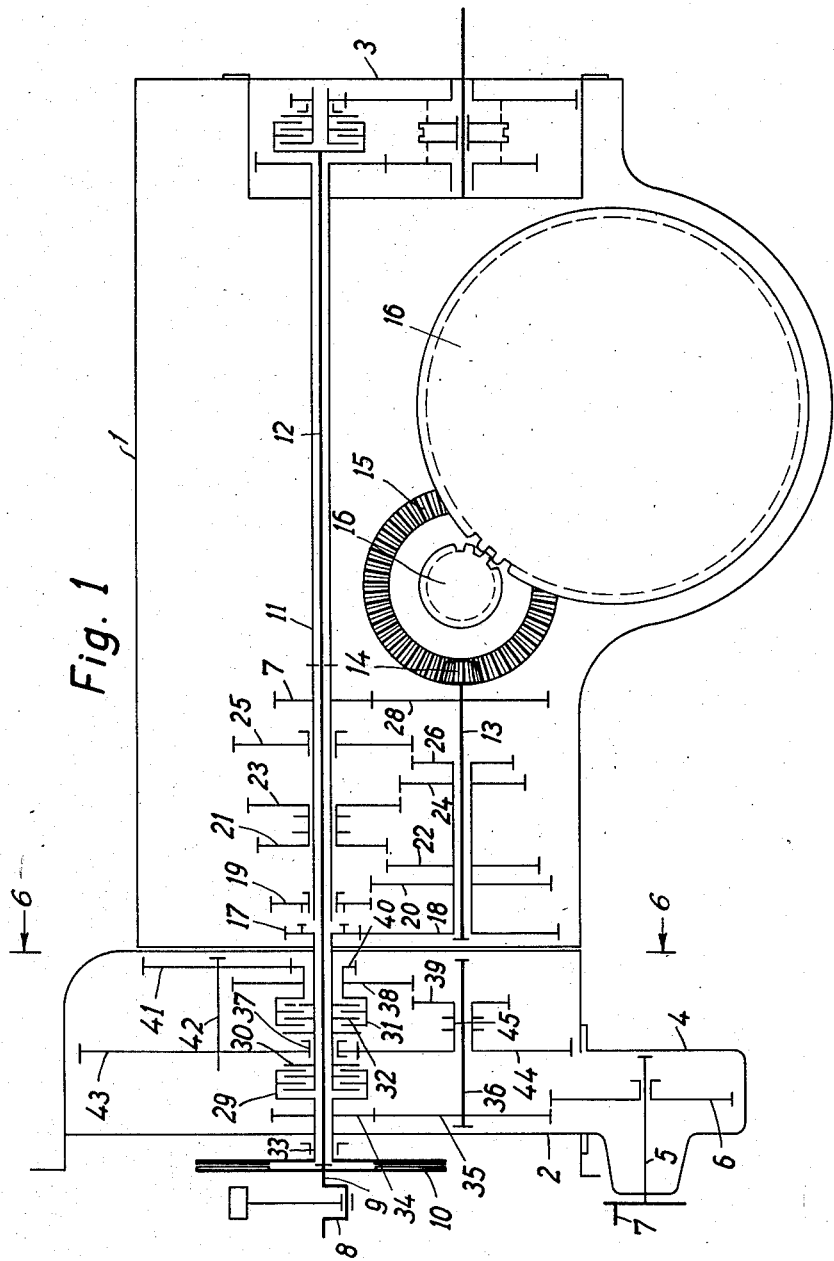

March 21, 1961  K. HAVERLENDER  2,975,656
CHANGE-SPEED GEAR UNIT FOR MOTOR VEHICLES
Filed April 21, 1959  6 Sheets-Sheet 1

Inventor:
Karl Haverlender
Attorney

March 21, 1961 K. HAVERLENDER 2,975,656
CHANGE-SPEED GEAR UNIT FOR MOTOR VEHICLES
Filed April 21, 1959 6 Sheets-Sheet 6

INVENTOR
KARL HAVERLENDER
BY
ATTORNEY.

United States Patent Office 2,975,656
Patented Mar. 21, 1961

2,975,656
CHANGE-SPEED GEAR UNIT FOR MOTOR VEHICLES

Karl Haverlender, 75 Ferdinand-Wallbrecht-Str., Hannover, Germany

Filed Apr. 21, 1959, Ser. No. 807,932

Claims priority, application Germany Apr. 21, 1958

10 Claims. (Cl. 74—745)

The present invention relates to a change-speed gear unit for motor vehicles, tractors, or the like which is fitted with an additional reduction gearing to provide for so-called crawling speeds. Tractors equipped with such gear units are mainly employed in agriculture. For shifting the different crawling speeds, it is necessary to actuate the engine clutch. If the tractor is equipped with a front or rear mounted loader, actuation of the engine clutch, the forward and reverse gear is necessary for forward and reverse drive during loading operation.

It is one object of the present invention to provide a change-speed gear unit which eliminates the above described deficiencies, in that a reversing clutch is employed, which is known per se, to enable selective engagement of the reversing gears or the reduction gearing, as may be desired.

Besides simplifying loading operations, the reversing clutch allows for shifting from normal speeds to crawling speeds without actuation of the engine clutch.

It is another object of the present invention to provide a change-speed gear unit, wherein the back gearing for the reversing clutch is provided, in addition to the gears forming the reversing gears, with a pair of gears which forms the crawling-speed reduction gearing. Thus, a simple constuction of the gear unit is obtained. The reversing clutch with the associated back gears may be fitted in a separate housing in front of the change-speed gear unit so that standard tractors may be equipped with a reversing clutch at a later date.

It is still another object of the present invention to provide a change-speed gear unit for motor vehicles, wherein the reversing clutch is mounted directly on the drive shaft for the change-speed gear unit, the clutch sleeve rotating together with the drive shaft and the forward clutch being connected with the engine shaft, while the rear clutch is rotatably journalled on the drive shaft for the change-speed gear unit to be engaged, through means of back gears, either with the reversing gears or with the reduction gearing.

It is yet another object of the present invention to provide a change-speed gear unit for motor vehicles, wherein besides the control lever for the reversing clutch, a second lever is provided to engage either the reversing gears for loading work, or the reduction gearing for crawling speeds.

Figure 6:
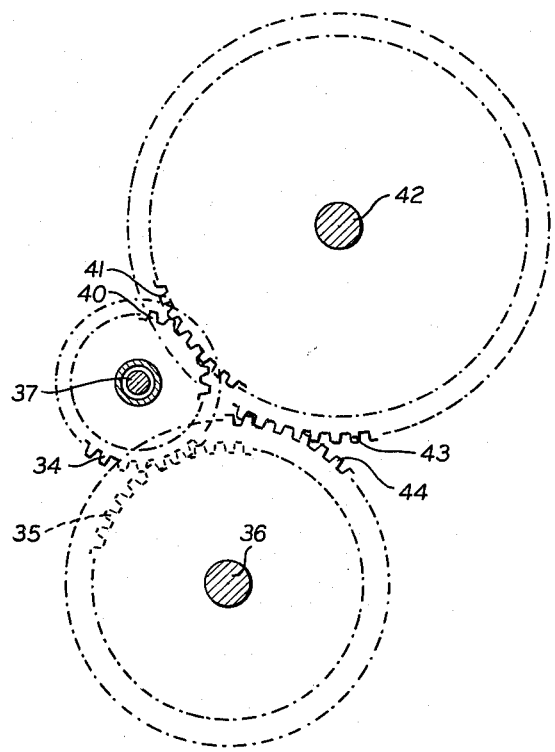

With these and other objects in view, which will become apparent in the following detailed description, the present invention will be clearly understood in connection with the accompanying drawings, in which:

Figures 1 to 5 are diagrammatic views of the complete gear unit, showing the engagement of different gear trains; and Figure 6 is a section along the lines 6—6 of Fig. 1.

Referring now to the drawings, a housing 2 for the reduction gearing, the reversing gears, and the reversing clutch is fitted at the forward end of a gear-box 1. Inside the rear part of the gear-box 1, in a separate housing 3, the power take-off drive is arranged which is of no importance with respect to the present invention. At a side of the housing 2, a shaft 5 with a gear 6 for a crank assembly 7 is accommodated in a housing 4. Members 4 to 7 form an auxiliary drive for a mower bar, for instance.

In front of the gear-box 1 there is an engine 8. Its shaft 9 carries the clutch 10, engaging and disengaging the engine with a hollow drive shaft 11 with an intermediate reversing unit for the change-speed gear unit. Furthermore, the engine shaft 9 is directly connected with the power take-off drive through means of a shaft 12 passing through the hollow shift 11. The shaft 12 allows for the power take-off to be driven independently from the clutch and the change-speed gear unit.

A countershaft 13, driving the rear axle drive 16 through means of a pair of bevel gears 14, 15, is journalled in the gear-box 1 parallel to the drive shaft 11.

Mounted on the shafts 11 and 13, respectively, are pairs of gears 17, 18, 19, 20, 21, 22, 23, 24, 25, 26, 27, 28. The gears 18, 20, 22, 24, and 26 are arranged on a common sleeve which is longitudinally displaceable on the countershaft 13.

The reversing unit is accommodated in the housing 2 and comprises a forward clutch 29, 30 and a rear clutch 31, 32. Member 29 of the forward clutch is rigidly fixed to a sleeve 33 which can be engaged with the engine shaft by means of the clutch 10. The sleeve 33 also carries a gear 34 which engages a gear 35 on a second countershaft 36. The clutch member 30, however, together with the clutch member 32, is mounted on a sleeve 37 which is slideable along and rotating with the gear 17 for the change-speed gear unit. The clutch member 31 is freely rotating on the sleeve 37 and carries a gear 38 and a pinion 40, the gear 38 co-operating with a gear 39 on the countershaft 36, and the pinion 40 engaging a gear 41 on a shaft 42. Together with the gears 41 and 43, the shaft 42 forms the reversing gear assembly which is driven from a gear 44 on the countershaft 36. Both gears 39 and 44 are mounted on a sleeve 45 which is axially displaceable on the countershaft 36.

A lever, which is not illustrated, actuates the reversing clutch. In intermediate position of the lever, both clutches are disengaged so that the gear unit is idling although the engine clutch 10 is engaged.

The reduction gearing is engaged by means of a lever (not shown) provided on the housing 2. It is obvious that different trains of gears can be engaged and disengaged.

Figure 2:
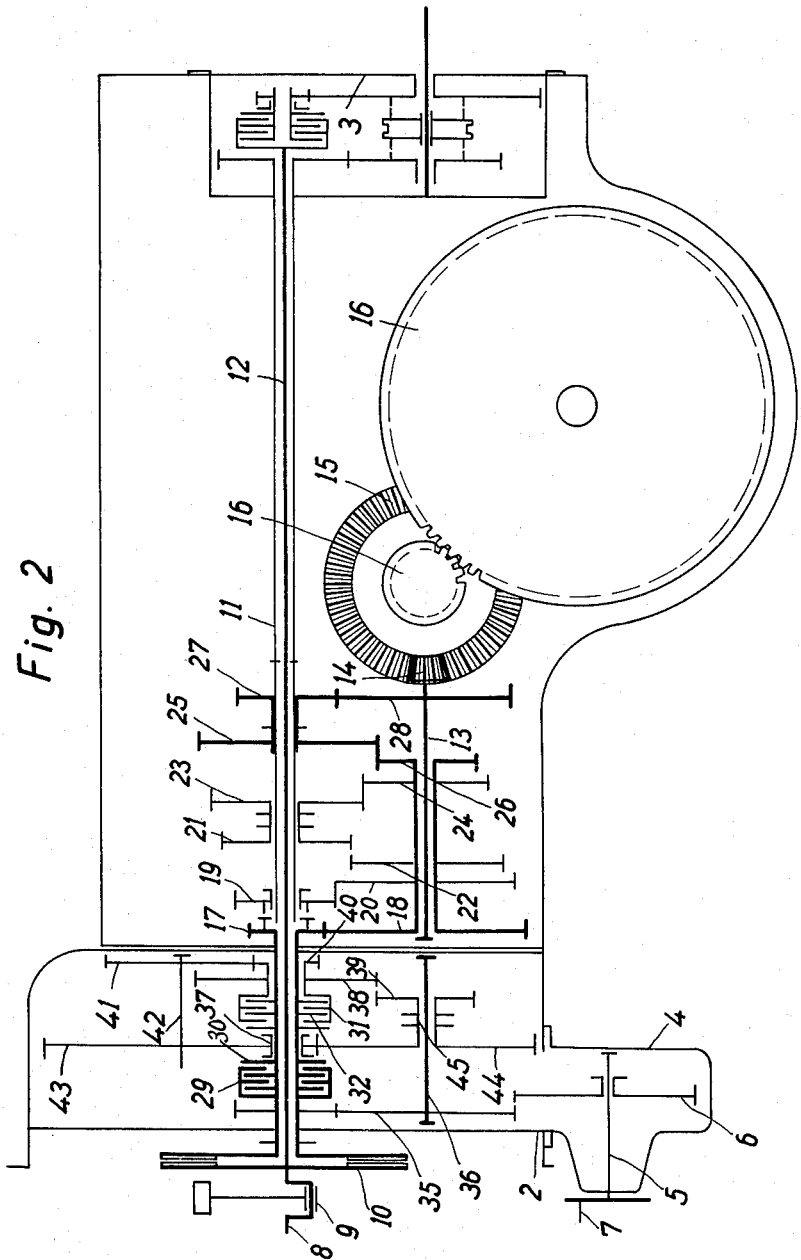

In the arrangement according to Fig. 2, the conventional five-speed gear unit is engaged for forward travel. The forward clutch 29, 30 is engaged so that from the engine shaft 9, through the engine clutch 10 and the forward reversing clutch 29, 30 the gear 17 is driven by the latter and through the gears 18 and 26 and the gears 25, 27, and 28 the rear axle drive 15, 16 so that the tractor travels at a certain speed according to the gear selected.

Figure 3:
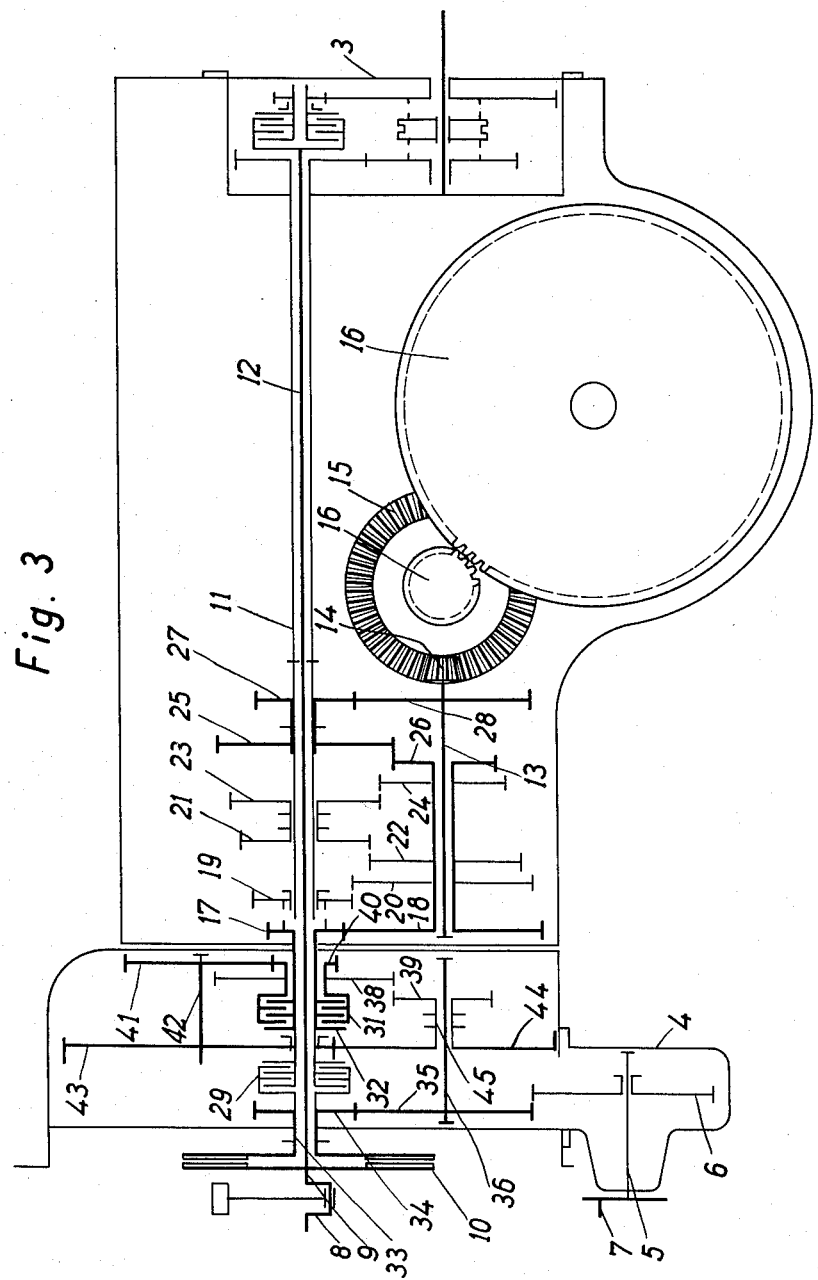

In Fig. 3 the rear clutch 31, 32 is engaged as well as the reversing gears so that now the tractor travels backwards at a speed according to the selected gear in the five-speed gear unit. The drive is from the engine 8 through the shaft 9, the engine clutch 10, the gears 34, 35, the second counter shaft 36, the reversing gears 44, 43, the shaft 42, the gears 41, and 40, the rear reversing clutch 31, 32 to gears 17 and 18, 26, 25, and from there through the hollow drive shaft 11 to the gears 27 and 28 and the change-speed gear unit in a manner similar to that shown in Fig. 2.

Figure 4:
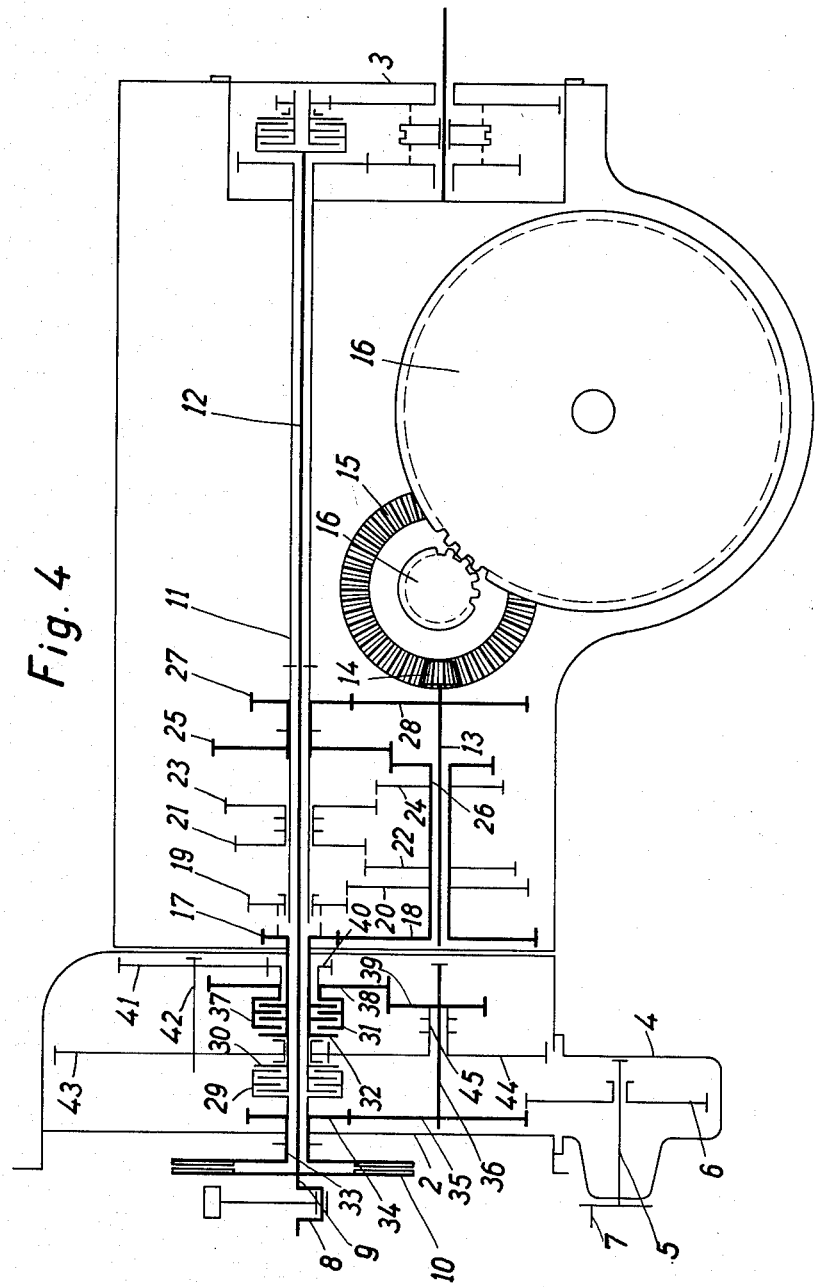
Figure 5:
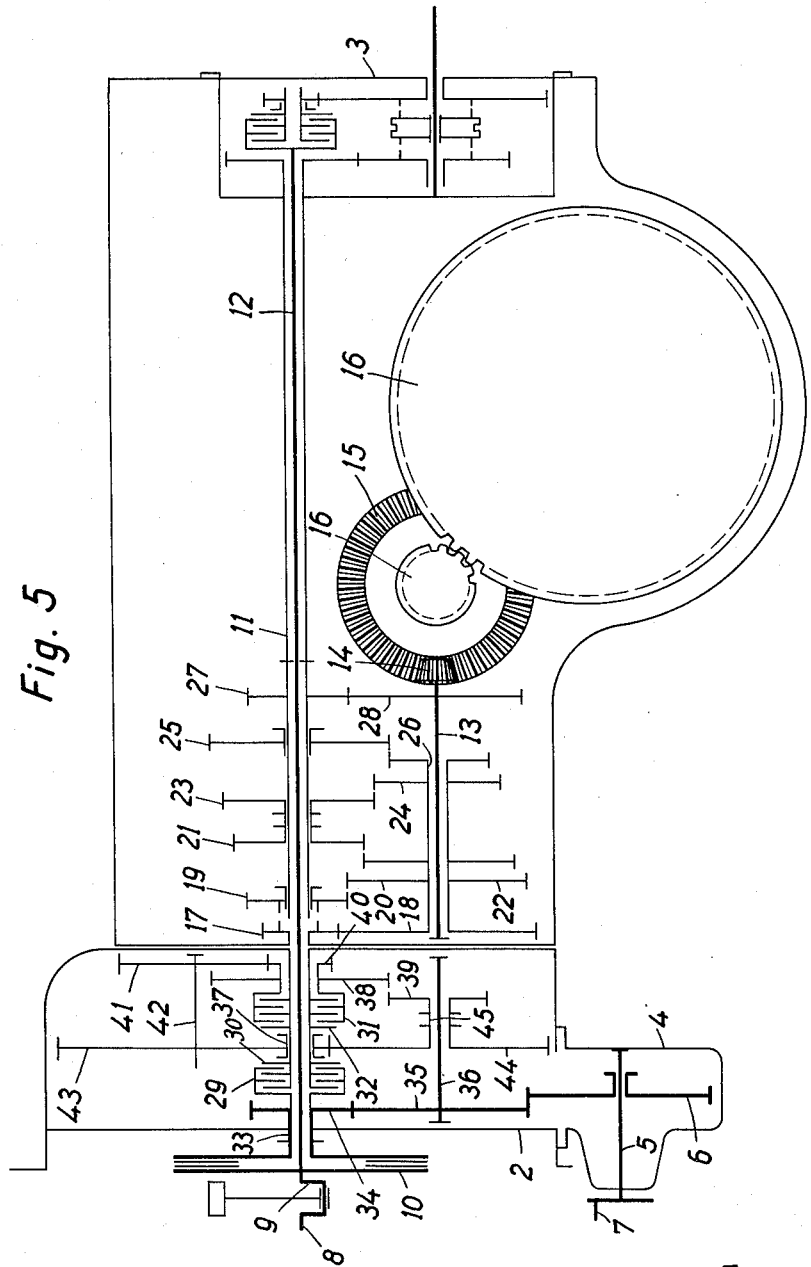

In Fig. 4 the reduction gearing 39, 38 for crawling speed is engaged instead of the reversing gears 41, 42, 43. This is accomplished by shifting the preselector lever. After this, the rear clutch 31, 32 can be engaged again.

The drive is now from the engine shaft 9, through the engine clutch 10, the gears 34, 35, the second counter shaft 36, the reducing gears 39, 38, and the reversing clutch 31, 32 to the gears 17, 18, 26, 25 to the drive shaft 11, and then through the gears 27, 28 in the change-speed gear unit.

Thus, it is possible to shift from a normal gear to the corresponding crawling speed by engaging and disengaging the rear reversing clutch.

This can be done without actuating the engine clutch. In the embodiment according to Fig. 5, the reversing clutch is disengaged. The auxiliary drive 4 to 7 is engaged, which is driven from the shaft 9, through the engine clutch 10 and the gears 34, 35. The vehicle is stationary, because the reversing clutch is disengaged and the gears are idling.

While I have disclosed one embodiment of the present invention, it is to be understood that this embodiment is given by example only and not in a limiting sense, the scope of the present invention being determined by the objects and the claims.

I claim:

1. A change-speed gear unit for vehicles, especially tractors or the like, including an engine, an engine shaft and an engine clutch driven by said engine, a drive shaft driven by said clutch, and a gear box including said change-speed gear, and said change-speed gear unit having an additional reduction gearing in front of said change-speed gear unit to obtain crawling speeds, and a reversing gearing for all normal speeds, both gearings selectively constituting a power train from said engine to said change-speed gear unit, a reversing unit comprising two clutches, one of said clutches providing a forward drive and the other of said clutches providing a reverse drive, one of said clutches being disposed between said engine shaft and said drive shaft for said change-speed gear unit, and the other of said clutches being disposed between said reversing gearing and said reduction gearing, respectively, and said change-speed gear unit, so that upon rendering operative said one of said clutches said engine is directly connected with said change-speed gear unit and upon rendering operative said other of said clutches, said engine is connected with said change-speed gear unit by means of said reversing and said reduction gearing, respectively.

2. The change-speed gear unit, as set forth in claim 1, which includes a preselector lever to enable shifting from said reversing gearing to said reduction gearing, said lever being adjustable to an intermediate position in which both, said reversing gearing and said reduction gearing, are disengaged.

3. The change-speed gear unit, as set forth in claim 1, wherein said clutches of said reversing unit, in addition to their end positions, are adjustable to an intermediate position in which the drive from said engine to the change-speed gear unit is interrupted.

4. The change-speed gear unit, as set forth in claim 1, wherein said clutches having inner discs and outer discs, and said inner discs of both said clutches rotate together with said drive shaft of said change-speed gear unit, while said outer discs facing said engine are mounted on said engine shaft and said outer discs facing the change-speed gear unit carry the last gear for said reversing gearing and said reduction gearing, respectively.

5. The change-speed gear unit, as set forth in claim 4, wherein said outer discs facing said change-speed gear unit have two gears, said reversing gearing including one gear continuously meshing with one of said two gears of said outer discs and said reduction gearing including one gear continuously meshing with the other of said two gears of said outer discs and a counter shaft, a pair of sliding gears being disposed on said counter shaft, said sliding gears being driven from said engine shaft by a pair of meshing gears mounted on said engine shaft and said counter shaft, respectively, a preselector lever for engaging selectively said pair of sliding gears with said reversing gearing and said reduction gearing, respectively.

6. The change-speed gear unit, as set forth in claim 5, which includes an additional housing fitted to said gear box of the vehicle receiving said reversing unit together with said reversing gears and said reduction gearing.

7. The change-speed gear unit, as set forth in claim 6, which includes an auxiliary drive operatively connected with said pair of gears driving said counter shaft.

8. The change-speed gear unit, as set forth in claim 7, wherein said auxiliary drive comprises a power take-off shaft.

9. The change-speed gear unit, as set forth in claim 7, wherein said auxiliary drive comprises a mower bar.

10. The change-speed gear unit, as set forth in claim 1, wherein said engine clutch and said reversing unit, as well as said drive shaft of the change-speed gear unit are mounted on hollow shafts and a power take-off shaft extending therethrough directly connected to said engine shaft.

References Cited in the file of this patent

UNITED STATES PATENTS

| | | |
|---|---|---|
| 2,618,979 | Benning | Nov. 25, 1952 |
| 2,661,634 | Bechman et al. | Dec. 8, 1953 |
| 2,672,056 | Stone | Mar. 16, 1954 |
| 2,743,789 | Ferguson et al. | May 1, 1956 |
| 2,881,627 | Hubert et al. | Apr. 14, 1959 |